US011158314B2

(12) United States Patent
Kao et al.

(10) Patent No.: US 11,158,314 B2
(45) Date of Patent: Oct. 26, 2021

(54) VOICE CONTROL DEVICE AND METHOD

(71) Applicant: PEGATRON CORPORATION, Taipei (TW)

(72) Inventors: Cheng-Yu Kao, Taipei (TW); Nien-Chih Wang, Taipei (TW); Yu-Hung Tseng, Taipei (TW); Yueh-Fei Chang, Taipei (TW); Chih-Lun Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 329 days.

(21) Appl. No.: 16/384,192

(22) Filed: Apr. 15, 2019

(65) Prior Publication Data

US 2019/0371323 A1    Dec. 5, 2019

(30) Foreign Application Priority Data

Jun. 4, 2018  (TW) .................................. 107119177

(51) Int. Cl.
| | |
|---|---|
| *G10L 15/22* | (2006.01) |
| *G10L 15/24* | (2013.01) |
| *G06K 9/00* | (2006.01) |
| *G10L 15/30* | (2013.01) |

(52) U.S. Cl.
CPC .......... *G10L 15/22* (2013.01); *G06K 9/00268* (2013.01); *G06K 9/00288* (2013.01); *G10L 15/24* (2013.01); *G10L 15/30* (2013.01); *G10L 2015/223* (2013.01)

(58) Field of Classification Search
CPC ......... G06F 3/167; G10L 15/22; G10L 15/25; G10L 17/00
See application file for complete search history.

(56) References Cited

U.S. PATENT DOCUMENTS

| | | | |
|---|---|---|---|
| 6,243,683 B1* | 6/2001 | Peters ..................... | G10L 15/24 434/4 |
| 2003/0171932 A1* | 9/2003 | Juang ...................... | G10L 15/24 704/276 |
| 2004/0151347 A1 | 8/2004 | Wisniewski | |

(Continued)

FOREIGN PATENT DOCUMENTS

| | | |
|---|---|---|
| CN | 103218555 A | 7/2013 |
| CN | 104820556 A | 8/2015 |

(Continued)

*Primary Examiner* — Daniel Abebe
(74) *Attorney, Agent, or Firm* — Li & Cai Intellectual Property (USA) Office

(57) ABSTRACT

A voice control device includes a user database, a first image capturing module, a voice command module and a management module. The user database stores first user identification data of a first user account. The first image capturing module captures an environmental image. The voice command module is enabled to receive a voice command for controlling the voice control device. The management module is used to detect whether at least one facial image exists in the environmental image, and detect whether the facial image matches with the first user identification data, and when the facial image matches with the first user identification data, the management module logs in the first user account and enables the voice command module.

19 Claims, 10 Drawing Sheets

(56) References Cited

U.S. PATENT DOCUMENTS

| | | | |
|---|---|---|---|
| 2015/0222948 A1* | 8/2015 | Wang | H04N 21/4223 725/37 |
| 2015/0254062 A1* | 9/2015 | Kim | H04N 21/4223 345/156 |
| 2017/0084275 A1* | 3/2017 | Koetz | A47J 43/07 |
| 2018/0268747 A1* | 9/2018 | Braun | G06K 9/00671 |
| 2018/0338178 A1* | 11/2018 | Richman | G10L 17/04 |

FOREIGN PATENT DOCUMENTS

| | | |
|---|---|---|
| CN | 105068460 A | 11/2015 |
| CN | 105700363 A | 6/2016 |
| CN | 103369391 B | 12/2016 |
| CN | 106203369 A | 12/2016 |
| CN | 107147609 A | 9/2017 |
| CN | 107368720 A | 11/2017 |
| CN | 107944247 A | 4/2018 |
| TW | 201220214 A | 5/2012 |
| WO | 2015076828 A1 | 5/2015 |

\* cited by examiner

VOICE CONTROL DEVICE AND METHOD

CROSS-REFERENCE TO RELATED PATENT APPLICATION

This application claims the benefit of priority to Taiwan Patent Application No. 107119177, filed on Jun. 4, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a voice control device and method capable of utilizing face detection and face recognition to automatically switch user accounts while avoiding wake-up words.

BACKGROUND OF THE DISCLOSURE

While conventional smart multimedia devices allow users to operate with voice commands and are popular, users must say wake-up words before speaking voice commands, for example, "Hey Alexa" of Amazon Echo, or "OK Google" of Google Home, so as to wake up the smart speakers. However, this can be cumbersome and annoying to the user, and also causes such devices to be limited in the home application and popularity.

At present, some smart multimedia devices have been improved for this purpose. For example, within a limited time after a conversation (for example, within 5 seconds), the user can directly utter the voice command without speaking the wake-up words first. Although the user only needs to say the wake-up words once, if the limited time is exceeded, the wake-up words must still be spoken before the voice command can be used.

In addition, most conventional smart multimedia devices do not support operation by multiple users, or even if multiple users are supported, an interface for switching between multiple users is not intuitive. If the user does not pay attention, it is easy for others to misuse their account, which leads to the leakage of personal information, and more seriously, the loss of personal rights or money.

Therefore, how the above-mentioned issues can be overcome by improving wake-up and security mechanisms to provide an intuitive and convenient operation method has become one of the important topics to be solved in this field.

SUMMARY OF THE DISCLOSURE

In response to the above-referenced technical inadequacies, the present disclosure provides a voice control device, which includes a user database, a first image capturing module, a voice command module and a management module. The user database stores first user identification data of a first user account. The first image capturing module captures an environmental image. The voice command module is configured to be enabled to receive a voice command to control the voice control device. The management module is used to detect whether at least one facial image exists in the environmental image, detect whether the facial image matches with the first user identification data, and when the facial image matches with the first user identification data, the management module logs in the first user account and enables the voice command module.

In one aspect, the present disclosure provides a voice control method, which includes: configuring a user database to store first user identification data of a first user account; capture at least one environmental image; detecting whether the environmental image has at least one facial image, and detecting whether the facial image matches with the first user identification data, and when the facial image matches with the first user identification data, logging in the first user account and enabling the voice command module; and enabling the voice control device to receive a voice command when the first user account is logged in.

One of the advantages of the present disclosure is that the voice control device provided by the present disclosure can automatically log in to the user account by using face detection and identification through the technical features of the "image capture module" and the "management module". Upon the successful detection of the face of a user, the user can issue a voice command without any wake-up words, thus omitting the need to repeat the wake-up words or eliminating concerns about exceeding the time limit. Multiple user operations are also intuitively supported, such that the misuse of personal accounts by others resulting in the leakage of personal information can be avoided, so as to avoid the loss of personal rights or money.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
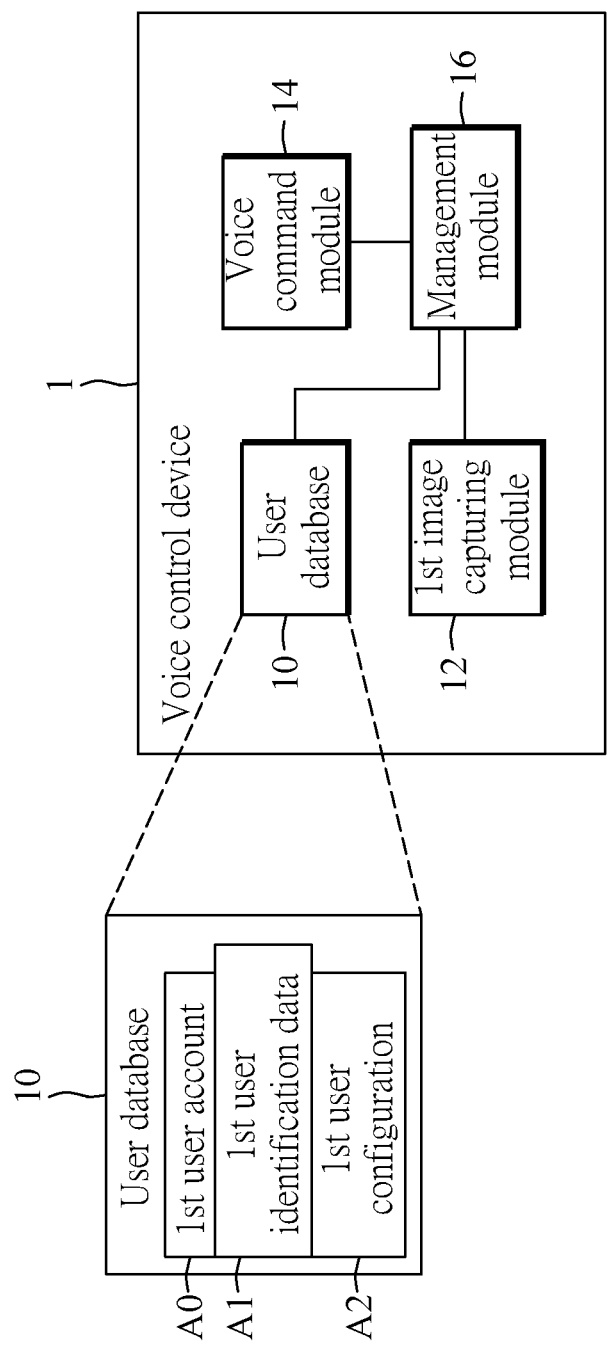
FIG. 1 is a functional block diagram of a voice control device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The embodiments of the "voice control device and method" disclosed in the present disclosure are described below by way of specific embodiments, and those skilled in the art can understand the advantages and effects of the present disclosure from the contents disclosed in the present specification. The disclosure can be implemented or applied in various other specific embodiments, and various modifications and changes can be made without departing from the spirit and scope of the present disclosure. In addition, the drawings of the present disclosure are merely illustrative and are not intended to be stated in the actual size. The following embodiments will further explain the related technical content of the present disclosure, but the disclosure is not intended to limit the scope of the present disclosure.

It should be understood that, although the terms "first," "second," "third," and the like may be used herein to describe various elements or signals, these elements or signals are not limited by these terms. These terms are primarily used to distinguish one element from another or one signal from another. In addition, the term "or" as used herein may include a combination of any one or more of the associated listed items, depending on the actual situation.

First Embodiment

Figure 2:
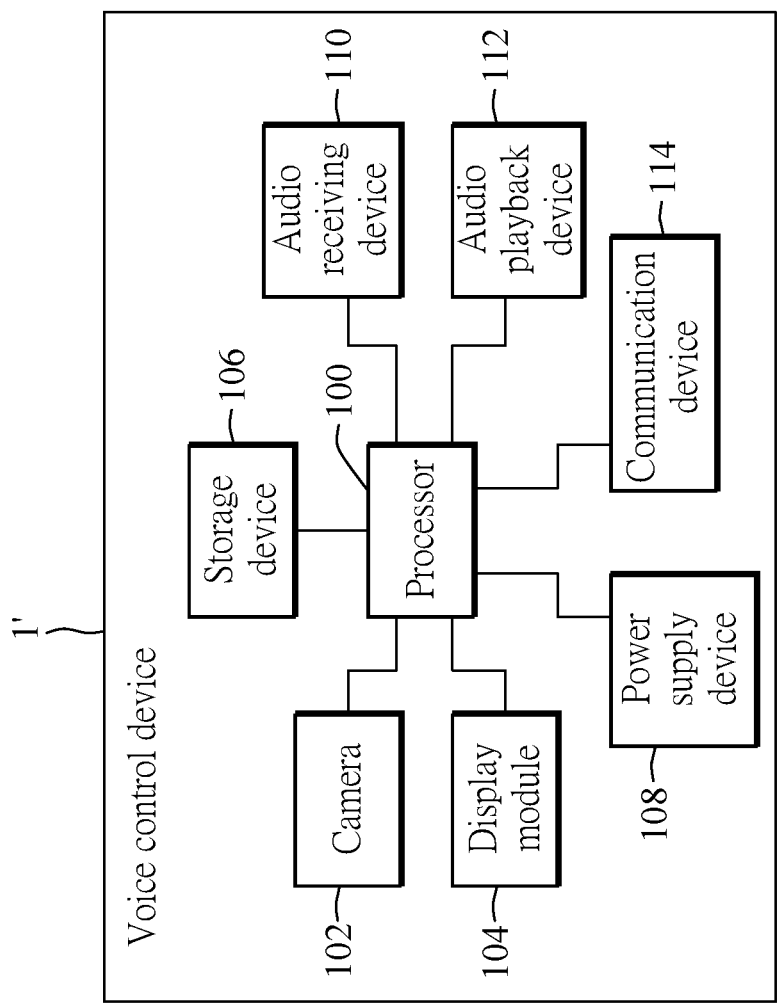
FIG. 2 is a block diagram showing a device structure of the voice control device according to the first embodiment of the present disclosure.
Figure 3A:
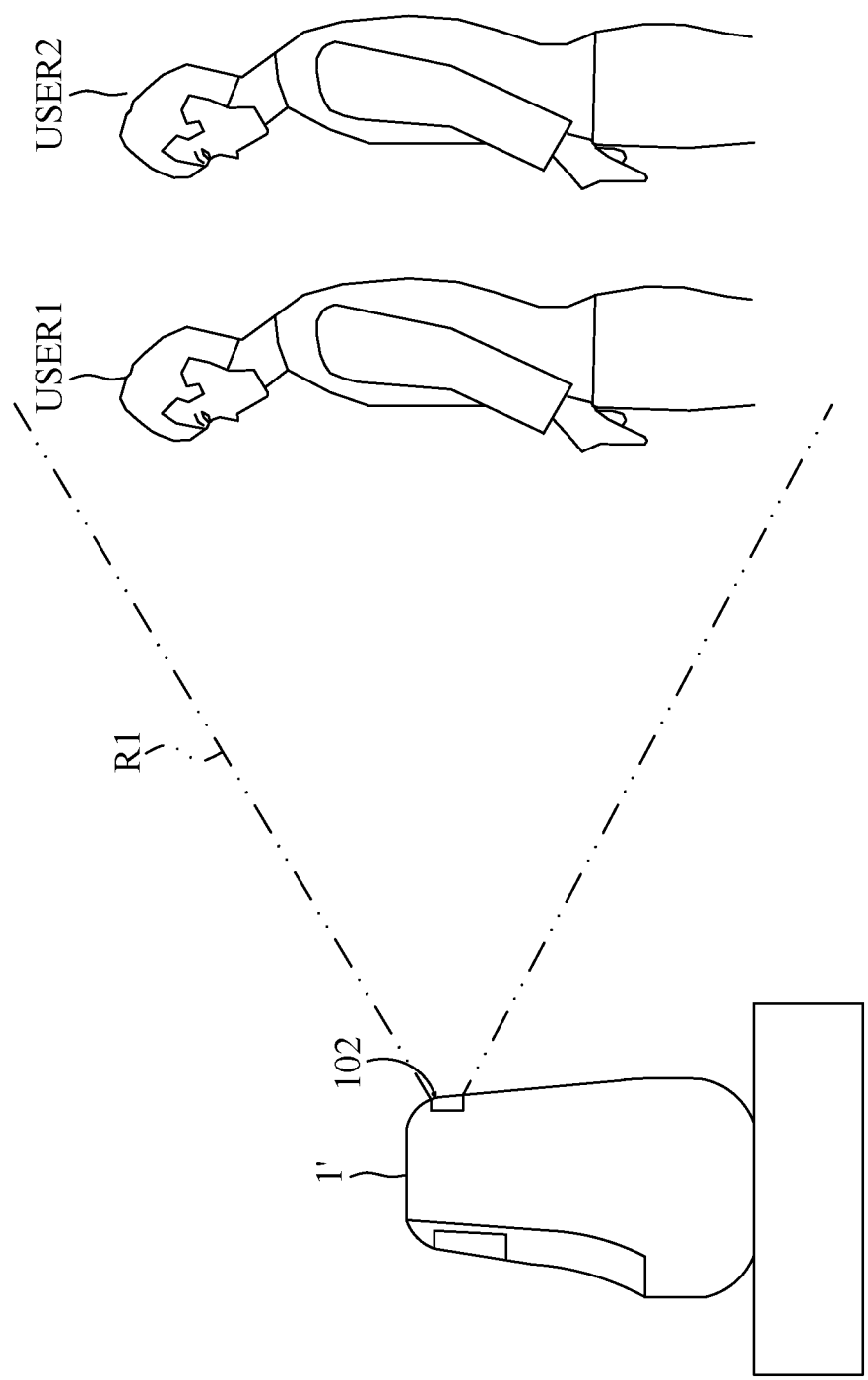
FIG. 3A is a schematic diagram showing an operation of a face detection and face recognition according to the first embodiment of the present disclosure.
Figure 3B:
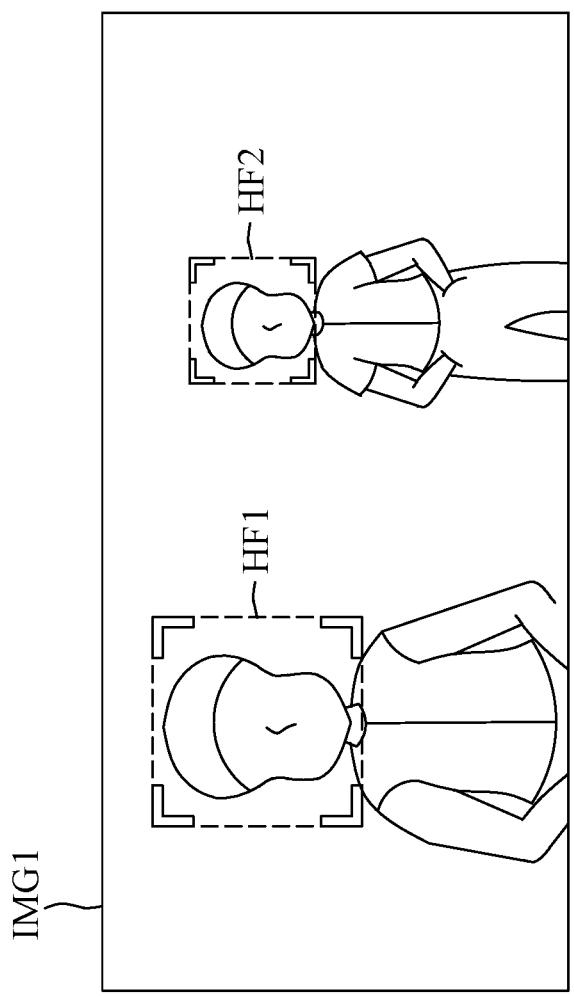
FIG. 3B is a schematic diagram of an environmental image of the face detection and face recognition according to the first embodiment of the present disclosure.

FIG. 1 is a functional block diagram of a voice control device according to a first embodiment of the present disclosure, FIG. 2 is a block diagram showing a device structure of the voice control device according to the first embodiment of the present disclosure, FIG. 3A is a schematic diagram showing an operation of a face detection and face recognition according to the first embodiment of the present disclosure, and FIG. 3B is a schematic diagram of an environmental image of the face detection and face recognition according to the first embodiment of the present disclosure. Reference is now made to FIGS. 1 to 3B, the first embodiment of the present disclosure provides a voice control device 1 including a user database 10, a first image capturing module 12, a voice command module 14, and a management module 16.

The voice control device 1 of the present embodiment can be implemented by the voice control device 1' of FIG. 2. The specific structure of the voice control device 1' includes a processor 100, a camera 102, a display module 104, a storage device 106, a power supply device 108, an audio receiving device 110, an audio playback device 112, and a communication device 114, which will be described below with respect to the functional relationship between the voice control devices 1 and 1'.

In the present embodiment, the storage device 106 is configured to store data described in the embodiments of the present disclosure, such as the user database 10, and the user database 10 is provided for the processor 100 to read and execute, such that the voice control device 1 can implement multimedia application operation described in the embodiments of the present disclosure. In this embodiment, the storage device 106 is, for example, a dynamic random access memory (DRAM), a flash memory, or a non-volatile random access memory (NVRAM) and so on. In detail, the storage device 106 including the user database 10 can store first user identification data A1 and a first user configuration A2 of a first user account A0.

In this embodiment, the processor 100 is a system on chip (SOC), but the present disclosure is not limited thereto. In other embodiments, the processor 100 can also be, for example, a central processing unit (CPU), or other programmable general-purpose or special-purpose microprocessors, digital signal processors (DSPs), programmable controllers, and application-specific integrated circuits (ASICs), Programmable Logic Devices (PLDs), other similar processors, or a combination of these devices.

In this embodiment, the first image capturing module 12 is mainly used to capture an environmental image. More specifically, the first image capturing module 12 can include the camera 102, and can perform a function control of the camera 102 through the processor 100 of the voice control device 1' or other built-in processors, for example, the camera 102 can be controlled to capture a focal length, a range, a direction, a contrast, a white balance, etc. of the environmental image, which can be used to assist in detecting a facial image in the environmental image, so as to improve an accuracy of subsequent face recognition.

Next, the voice command module 14 is configured to receive a voice command to control the voice control device 1. In detail, the voice command module 14 can include the audio receiving device 110 and can be implemented by the processor 100, the storage device 106, and the audio receiving device 110. For example, the storage device 106 can store an audio recognition algorithm and is executed by the processor 100. The audio receiving device 110 can be, for example, a microphone. When the microphone receives the ambient sound effect, the audio sound effect is decoded by the audio recognition algorithm to detect whether a voice command is included in the ambient sound effect. The voice command is further recognized to execute corresponding functions, and operations are performed by the processor 100 in accordance with the functions.

In addition, the voice control device 1 further includes a management module 16 for detecting whether at least one facial image exists in the environmental image captured by the first image capturing module 12, and identifying whether the facial image matches with the first user identification data A1. When the facial image matches with the first user identification data A1, the first user account A0 is logged in and the voice command module 14 is enabled. The management module 16 can include the processor 100 and can be implemented by the processor 100, the storage device 106, and the camera 102. For example, the storage device 106 can store a face recognition algorithm to be executed by the processor 100. When the camera 102 captures the environmental image, the face recognition algorithm identifies whether a facial image is included in the environmental image, and further identifies whether the facial image matches with the data in the user database 10, for example, identifies whether the facial image matches with the first user identification data A1. When the facial image matches with to the first user identification data A1, the first user account A0 is logged in and the audio receiving device 110 is enabled by the processor 100 to accept voice control. Here, the first user identification data A1 can include one or more facial images of a specific user and their features, and a corresponding facial image and the feature data thereof can be established as the user establishes the first user account A1.

In the present embodiment, the voice control device 1' further includes a power supply device 108 for providing a voltage signal to the processor 100 to enable the processor 100 to perform voice control operations of various embodiments of the present disclosure. Moreover, the power supply device 108 of the present embodiment can include a DC to DC converter to convert a magnitude of the DC voltage provided by the external power source or an internal battery, but the present disclosure is not limited thereto.

In this embodiment, the voice control device 1' further includes the audio playback device 112. The audio playback device 112 may include an electric speaker, an electromagnetic speaker, a piezoelectric speaker, an electrode speaker, and a plasma speaker, but the present disclosure is not limited thereto.

In this embodiment, the voice control device 1' further includes a display module 104, which can include, for example, one or more passive organic light emitting diodes (PMOLEDs), electronic paper display (EPD), liquid crystal display (LCD), light-emitting diode (LED), field emission display (FED) or other types of displays, but the present disclosure is not limited thereto.

In some embodiments, the first user configuration A2 established by the first user can be accessed by logging in the first user account A0 and storing the first user configuration A2 in the user database 10, and the first user configuration A2 can include media playlists, device settings and personal information. For example, the media playlists can include a favorite channel list or song playlists. In the embodiment, the voice control device 1' can be preset to display the favorite channel list and the song playlists created by the user on the display module 104 by logging in the first user account A0, thereby controlling the voice control device 1' to play a channel or song in the playlists by using the display module 104 and the audio playback device 112. The first user configuration A2 can further include the device settings such as DVR recordings, channels, songs, ratings, shows, themes, display settings, and/or volume settings. The first user configuration A2 can further include the personal information such as login information related to specific websites providing online music or video streaming services, and the login information can include personal purchase data. Moreover, the first user configuration A2 can be accessed by detecting a facial image of a user in the environmental image, and logging in, after an identity of the user is confirmed, the first user account A0.

In this embodiment, the voice control device 1' further includes a communication device 114, which may be, for example, a wireless transmission device, and can include devices supporting communication protocols such as wireless fidelity (Wi-Fi), global interoperability microwave access (WiMAX), Bluetooth, Ultra-Wideband (UWB) or Radio-frequency Identification (RFID). In some embodiments, the communication device 114 can establish a wireless connection by way of wireless transmission with another electronic device or cloud system having a wireless transmission device.

In an environment with network connection capability, after the voice control device 1' logs in the first user account A0, the user can directly perform online purchasing operations through voice commands.

Reference is made to FIGS. 3A and 3B together, a schematic diagram showing an operation of face detection and face recognition and a schematic diagram of the captured environmental image are provided. As shown, in a scenario, the users USER1 and USER2 enter an image capture range R1 of the camera 102, and the camera 102 captures an environmental image IMG1. Here, the user USER1 is closer to the voice control device 1' than the user USER2. Therefore, in the environmental image IMG1, the image of the user USER1 will be larger than the image of the user USER2, and therefore, the processor 100 performs the face recognition algorithm to recognize the environmental image IMG1, the facial images HF1 and HF2 of the users USER1 and USER2 are respectively obtained, and an area of the facial image HF1 is larger than that of the facial image HF2. Further, the processor 100 recognizes only the facial image HF1 having the largest area by performing the face recognition algorithm, and determines whether the facial image HF1 matches with the data in the user database 10, for example, whether the facial image HF1 matches with the first user identification data A1. When the facial image matches with the first user identification data A1, the first user account A0 is logged in and the audio receiving device 110 is enabled by the processor 100 to start accepting voice control. Moreover, upon the successful recognition of the facial image HF1, the first user account A0 remains in a login state, such that the user can continuously issue voice commands within a control distance without using any wake-up words, thus omitting the need to repeat the wake-up words or eliminating concerns about exceeding the time limit.

On the other hand, when the management module 16 recognizes that the facial image HF1 matching the first user identification data A0 has disappeared from the environmental image IMG1 or the facial image HF2' of the user USER2 is larger than the facial image HF1', the management module 16 disables the voice command module 14 and logs out the first user account A0. That is, when the facial image HF1 disappears from the environmental image IMG1, or the facial image having the largest image area does not match with the first user identification data A1, the processor 100 will log out the first user account A0 and disable the receiving device 110 to stop receiving voice commands. When the facial image having the largest image area does not match with the first user identification data A1, the processor 100 will log out of the first user account A0, and the management module 16 would need to re-detect whether the facial image HF2' of the USER2 matches with the user identification data in the database, so as to determine whether to log in as another user account, and performs the same procedure to achieve the purpose of switching the user account. In this way, the user does not have to worry about personal information being leaked or losing rights.

The present embodiment has been described in an exemplary manner with respect to the core concept of the present disclosure, which will be described in more detail in the following embodiments in accordance with the accompanying drawings.

Second Embodiment

Figure 4:
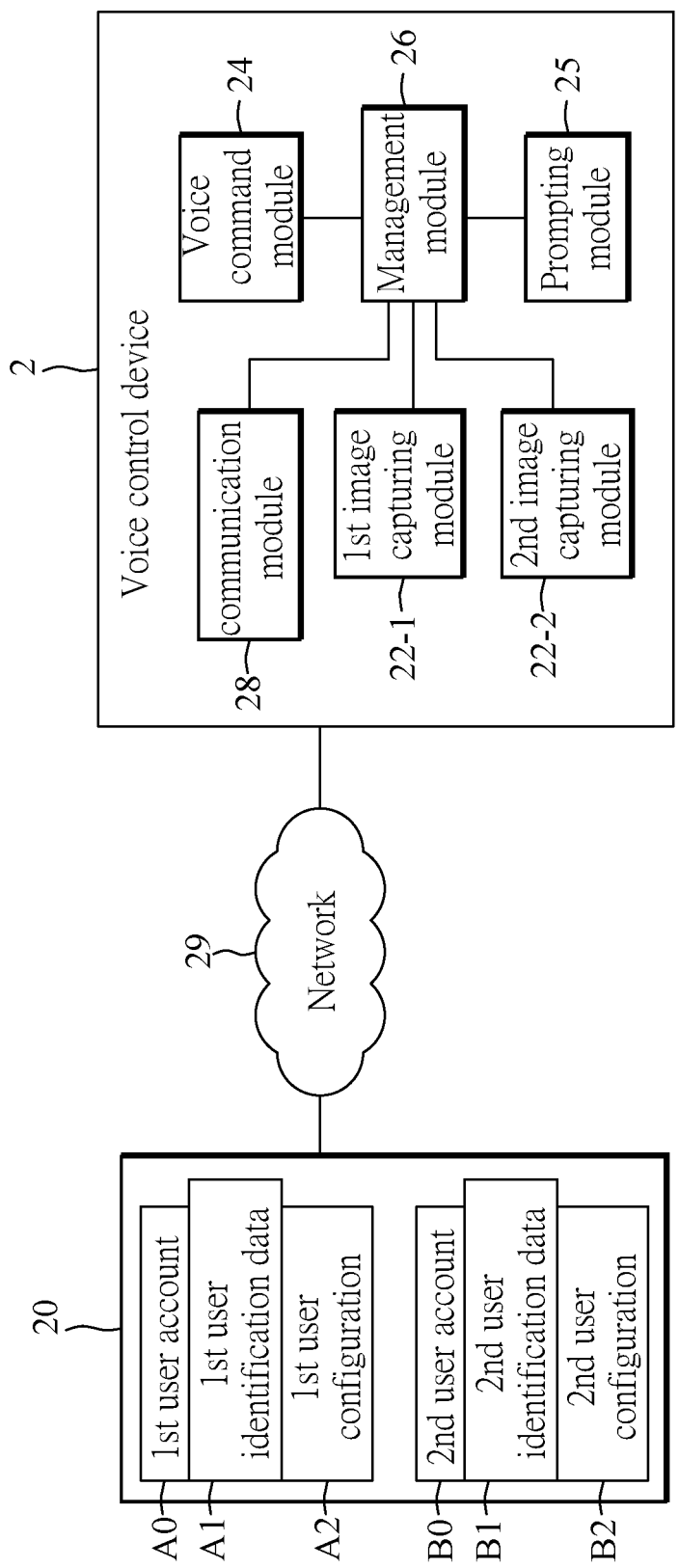
FIG. 4 is a functional block diagram of a voice control apparatus according to a second embodiment of the present disclosure.
Figure 5:
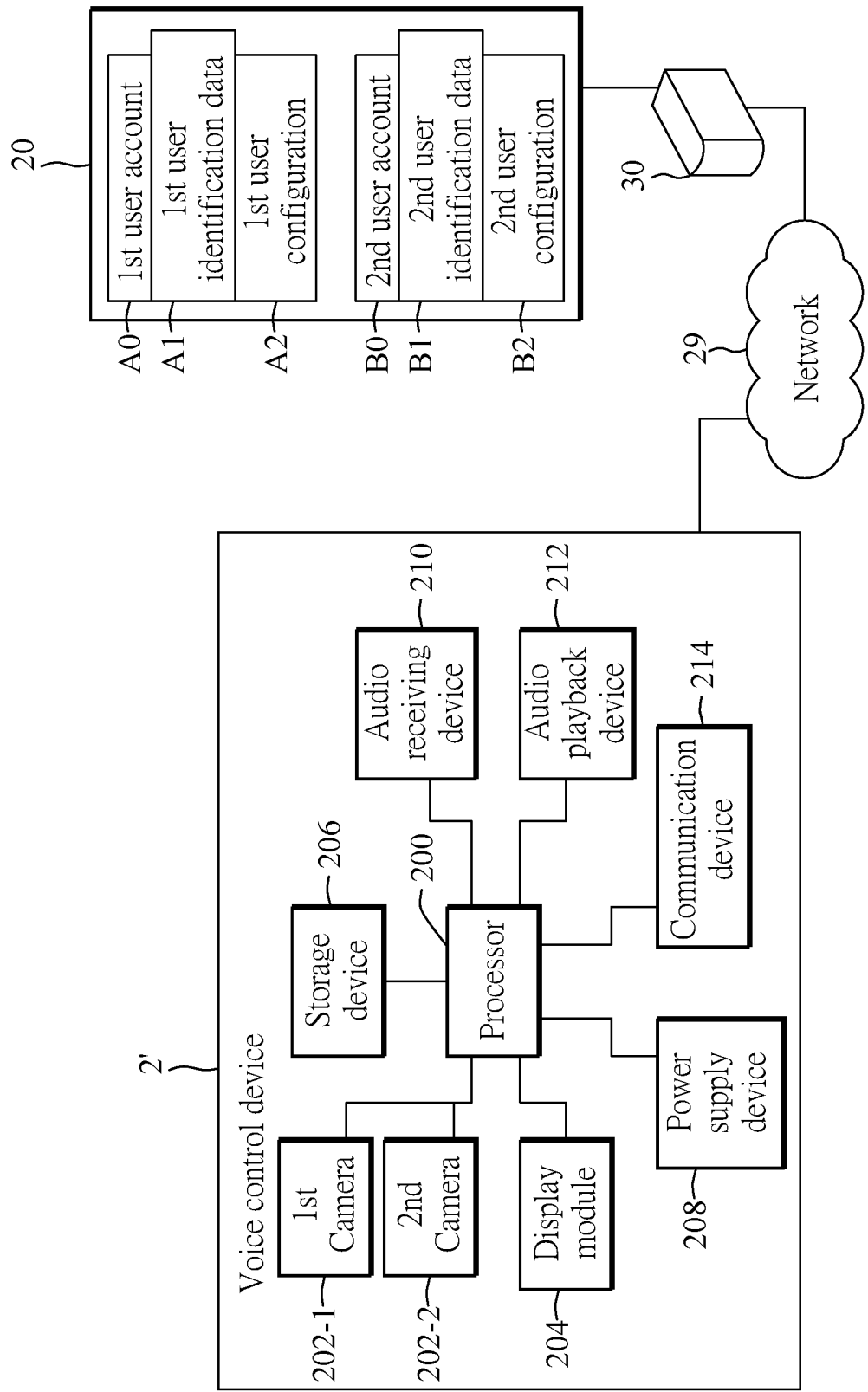
FIG. 5 is a block diagram showing a device structure of a voice control device according to the second embodiment of the present disclosure.
Figure 6A:
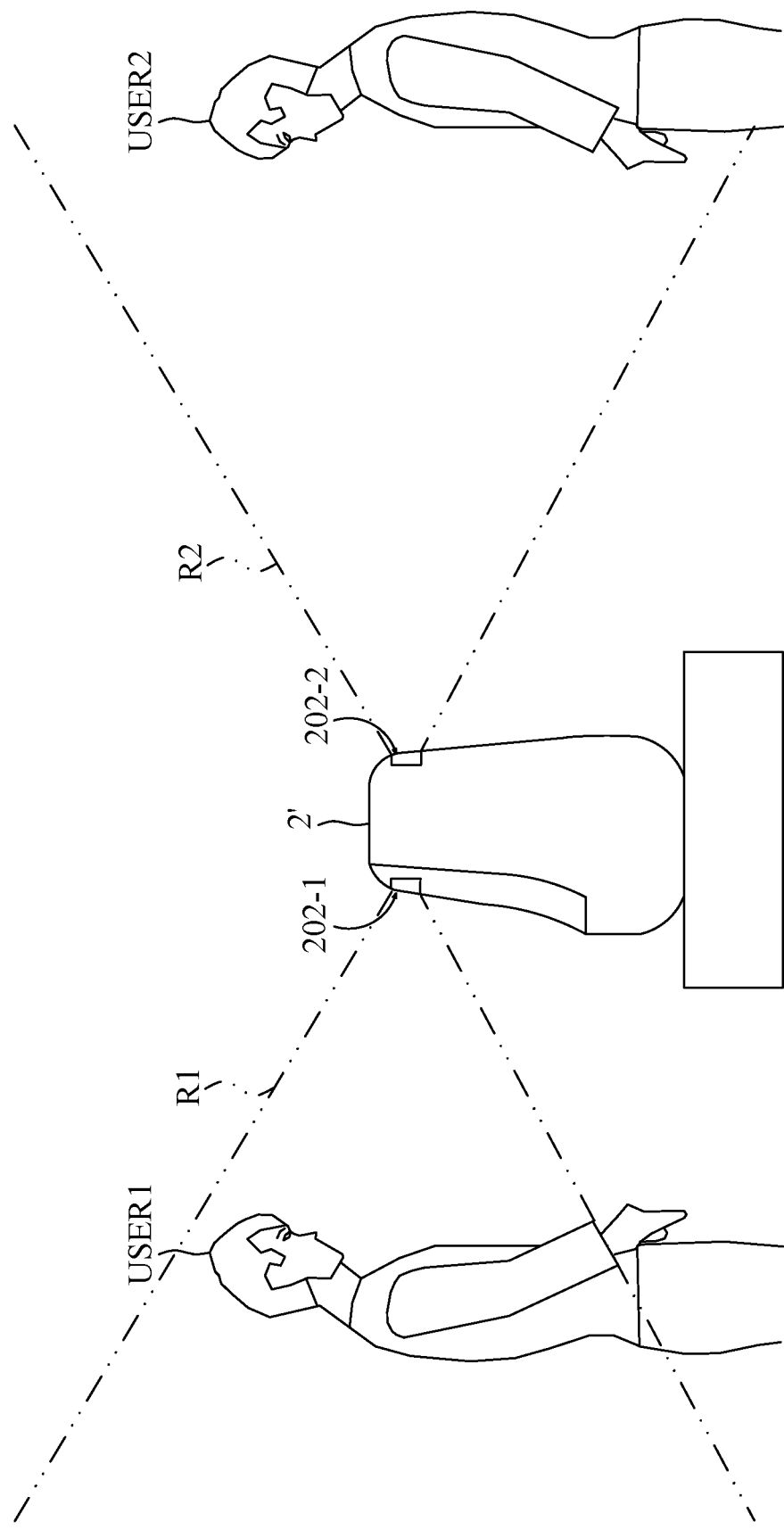
FIG. 6A is a schematic diagram showing an operation of a face detection and face recognition according to the second embodiment of the present disclosure.
Figure 6B:
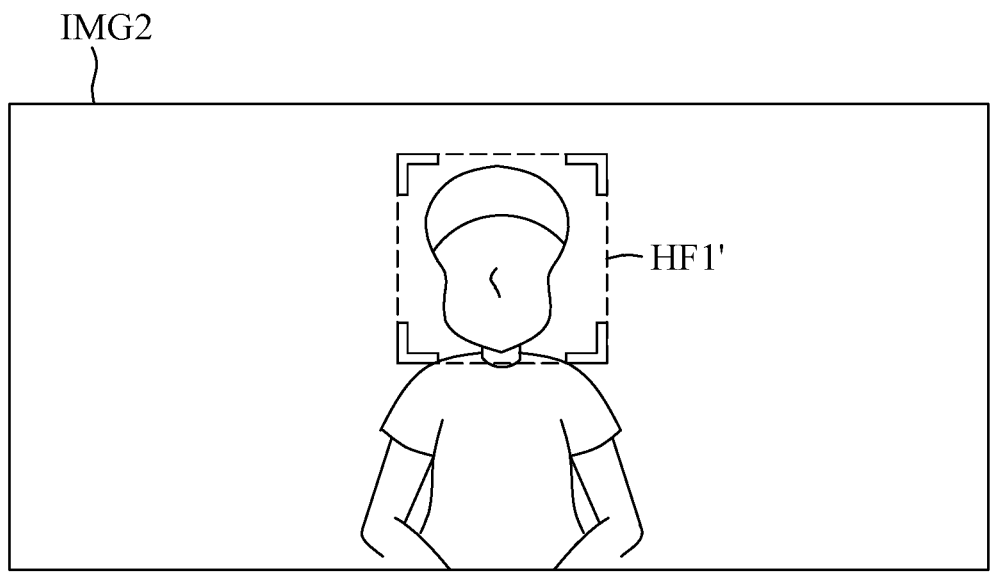
FIG. 6B is a schematic diagram of an environmental image of the face detection and face recognition according to the second embodiment of the present disclosure.
Figure 6B:
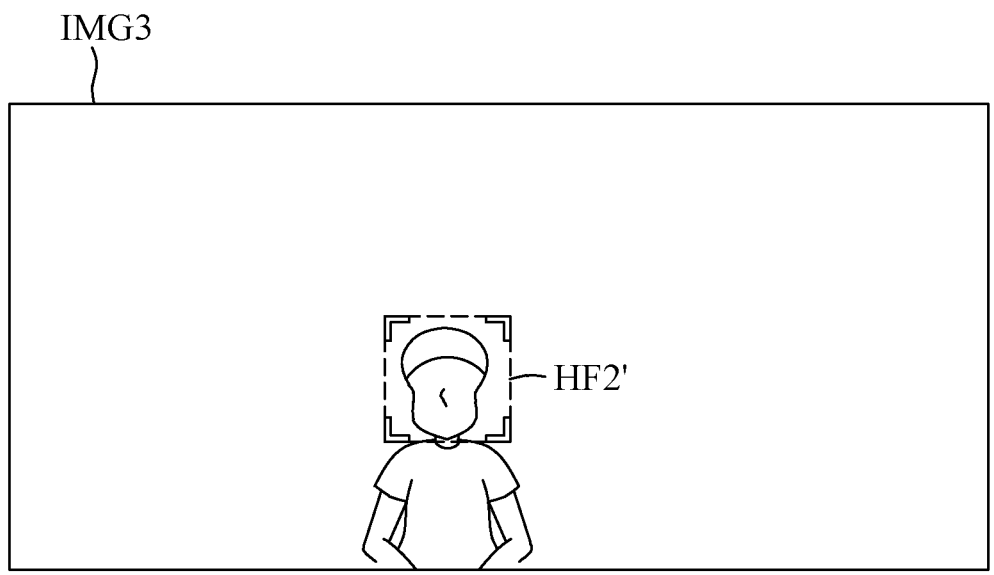

FIG. 4 is a functional block diagram of a voice control apparatus according to a second embodiment of the present disclosure, FIG. 5 is a block diagram showing a device structure of a voice control device according to the second embodiment of the present disclosure, FIG. 6A is a schematic diagram showing an operation of a face detection and face recognition according to the second embodiment of the present disclosure, and FIG. 6B is a schematic diagram of an environmental image of the face detection and face recognition according to the second embodiment of the present disclosure. Reference is now made to FIGS. 4 to 6B, the second embodiment of the present disclosure provides a voice control device 2 including a user database 20, a first camera 22-1, a second camera 22-2, a voice command module 24, a prompting module 25, and a communication module 28. The voice control device 2 of this embodiment can be implemented by the voice control device 2' of FIG. 5. The specific architecture of the voice control device 2' includes a processor 200, a first camera 202-1, a second camera 202-2, a display module 204, a storage device 206, a power supply device 208, an audio receiving device 210, an audio playback device 212, and a communication device 214 will be described below with respect to the functional relationship between the voice control devices 2 and 2'. In the present embodiment, like elements are denoted by like reference numerals, and repeated descriptions are omitted.

Further, in the embodiment, the voice control device 2 further includes the communication module 28 connected to a user database 20 via a network 29. The user database 20 can store first user identification data A1 and a first user configuration A2 of a first user account A0, and second user identification data B1 and a second user configuration B2 of a second user account B0. More specifically, the voice control device 2' can be connected to the network 29 via the communication device 214 to further connect with a cloud server 30, which can include the user database 20 described above. Therefore, the management module 26 can obtain the first user identification data A1 of the first user account A0 and the second user identification data B1 of the second user account B0 from the user database 20 through the communication module 28, so as to detect whether the captured facial image matches with the first user identification data A1 or the second user identification data B1.

In this embodiment, the voice control device 2' can include a plurality of cameras for acquiring a plurality of environmental images. For example, the first camera 202-1 and the second camera 202-2 may be included. When the plurality of facial images are recognized from the environmental images, the management module 26 only detects whether the facial image having the largest image area matches with the user identification data in the user database 20. For example, the management module 26 detects whether the facial image having the largest image area matches with the first user identification data A1 or the second user identification data A2.

In addition, the voice control device 2 further includes a prompting module 25, which is configured to initiate, when the first user account A0 or the second user account B0 is logged in, a first prompting operation to prompt that the first user account A0 or the second user account B0 is currently in use or not in use. In detail, functions of the prompting module 25 can be performed by the processor 200, the audio playback device 212, and the display module 204. The first prompting operation can include prompting the user by sounds, videos, or indicator lights, etc., and can be different prompting methods based on which one of the first user account A0 and the second user account B0 is now logged in.

Reference is now made to FIGS. 6A and 6B for illustrating how user accounts can be switched, and FIGS. 6A and 6B provide a schematic diagram showing operations of a face detection and face recognition and a schematic diagram of the captured environmental image. As shown in FIGS. 6A and 6B, in a scenario, users USER1 and USER2 respectively enter an image capturing range R1 of the first camera 202-1 and an image capturing range R2 of the second camera 202-2, the first camera 202-1 captures a first environmental image IMG2, and the second camera 202-2 captures a second environmental image IMG3. Here, in this embodiment, a right of control is obtained by the person whose distance is closer to the device. Under the same image-capturing condition, an image of the user USER1 in the first environmental image IMG2 is larger than an image of the user USER2 in the second environmental image IMG3; that is, the user USER1 is closer to the voice control device 2' than the user USER2. Therefore, the processor 200 recognizes the first environmental image IMG2 and the second environmental image IMG3 by performing a face recognition algorithm, and obtains facial images HF1' and HF2' of the users USER1 and USER2, respectively, and determines that an area of the facial image HF1' is larger than that of the facial image HF2'.

Further, the processor 200 recognizes only the facial image HF1' having the largest area by performing the face recognition algorithm, and determines whether the facial image HF1 matches with the data in the user database 20, for example, whether the facial image HF' matches with the first user identification data A1. When the facial image matches with the first user identification data A1, the first user account A0 is logged in and the audio receiving device 210 is enabled by the processor 200 to start accepting voice control, while performing the first prompting operation to prompt the user that the first user account A0 is currently in use by sounds, videos, indicator lights, or the like. Moreover, during the successful recognition of the facial image HF1', the first user account A0 remains in a login state, such that the user can continuously issue voice commands without using any wake-up words, thus omitting the need to repeat the wake-up words or eliminating concerns about exceeding the time limit.

The second embodiment is slightly different from the first embodiment, that is, when the management module 26 recognizes that the facial image HF2' of the USER2 is larger than the facial image HF1', the management module 26 first logs out the first user account A0. That is to say, the management module 26 needs to re-detect whether the facial image HF2' of the USER2 matches with the user identification data in the database to determine whether to log in as another user account, so as to achieve the purpose of switching the user account. It is conceivable that when the management module 26 recognizes that the facial image HF2' of the closer user USER2 matches with the second user identification data in the database, the first user account A0 is logged out and another user account is logged in. If it is determined that the facial image HF2' does not match with the second user identification data in the database, the audio receiving device 210 is disabled to stop receiving the voice command. In this way, the user does not have to worry about personal information being leaked or losing rights.

Therefore, multiple user operations are intuitively supported by the voice control method through the above configurations, such that the misuse of personal accounts by others resulting in the leakage of personal information can be avoided, and further preventing the loss of personal rights or money.

Third Embodiment

Figure 7:
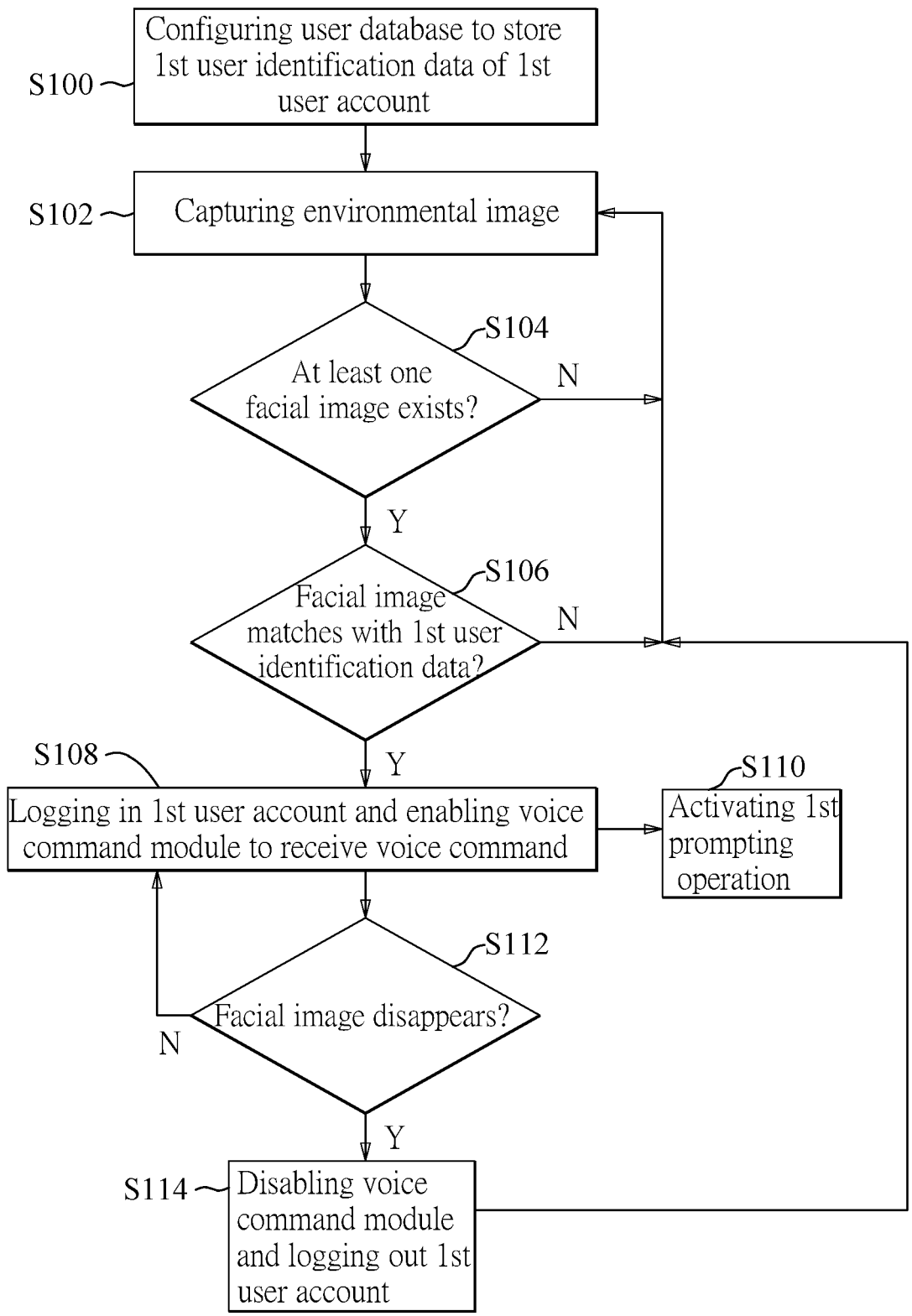
FIG. 7 is a flowchart of a voice control method according to a third embodiment of the present disclosure.
Figure 8:
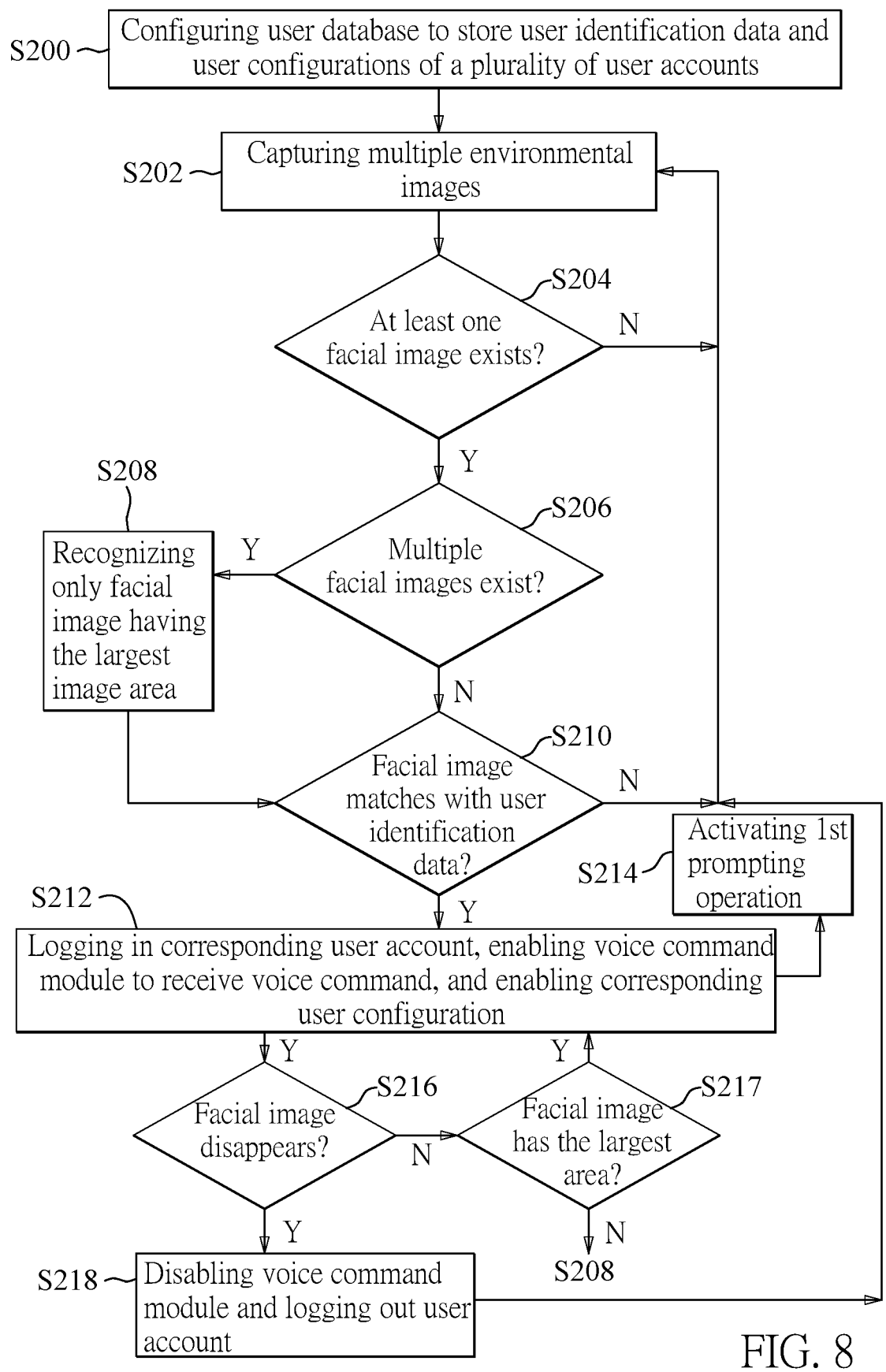
FIG. 8 is another flowchart of a voice control method according to the third embodiment of the present disclosure.

FIG. 7 is a flowchart of a voice control method according to a third embodiment of the present disclosure, and FIG. 8 is another flowchart of a voice control method according to the third embodiment of the present disclosure. The method described in this embodiment can be performed on the voice control device 1, 1', 2 or 2' shown in FIG. 1 to FIG. 6B. Therefore, reference is made to FIG. 1 to FIG. 6B for better understanding the voice control method, which includes the following steps:

Step S100: configuring a user database to store first user identification data of a first user account.

Step S102: capturing an environmental image.

Step S104: detecting whether the environmental image has at least one facial image. If the environmental image has at least one facial image, the method proceeds to step S106: detecting whether the facial image matches with the first user identification data.

If the facial image matches with the first user identification data, the method proceeds to step S108: logging in the first user account and enabling the voice command module to receive the voice command.

If it is recognized in step S104 that no facial image exists in the environmental image, or if the facial image does not match with the first user identification data in step S106, the method returns to step S102 to retrieve the environmental image.

On the other hand, after step S108, the method can proceed to step S110: activating the first prompting operation. As described in the previous embodiment, the first prompting operation may include prompting the user with the current account status of the first user account with sounds, images, or lights.

Step S112: configuring the management module to detect whether the facial image matching the first user identification data has disappeared from the environmental image. If the facial image matching the first user identification data has not disappeared from the environmental image, the method proceeds to step S108: maintaining the first user account to be logged in; and if the facial image matching the first user identification data has disappeared from the environmental image, the method proceeds to step S114: disabling the voice command module and logging out the first user account, and the method then returns to step S102 to retrieve the environmental image.

Therefore, the user can continuously issue voice commands without using any wake-up words through the above process, thus omitting the need to repeat the wake-up words or eliminating concerns about exceeding the time limit.

On the other hand, reference is made to FIG. 8, which provides another flowchart of the voice control method. The voice control method includes the following steps:

Step S200: configuring the user database to store user identification data and user configurations of a plurality of user accounts, for example, the first user identification data and the first user configuration of the first user account, and the second user identification data and the second user configuration of the second user account described in the above embodiments can be included.

Step S202: capturing multiple environmental images.

Step S204: detecting whether the plurality of environmental images have at least one facial image. If the plurality of environmental images have at least one facial image, the method proceeds to step S206: determining whether multiple facial images exist. If the multiple facial images exist, the method proceeds to step S208: recognizing only the facial image having the largest image area. The method proceeds to step S210: detecting whether the facial image matches with the first user identification data. If the management module determines that there is only one facial image in step S206, the method proceeds directly to step S210.

If the facial image matches with the first user identification data in step S210, the method proceeds to step S212: logging in the corresponding user account, enabling the voice command module to receive the voice command, and enabling the corresponding user configuration.

If the management module does not recognize any facial image from the environmental images in step S204, or if the facial image does not match with any user identification data in step S210, the process returns to step S202: the first and second image capturing modules capture the first and second environmental images.

On the other hand, after step S212, the method can proceed to step S214: activating the first prompting operation. The first prompting operation may include prompting the user with the current account status of the first user account with sounds, images, or lights.

Step S216: detecting whether the facial image matching the user identification data has disappeared from the environmental images, and if the facial image matching the first user identification data has disappeared from the environmental image, the method proceeds to step S218: disabling the voice command module and logging out the first user account, and the method then returns to step S202 to retrieve the environmental images by the image capturing modules. If the facial image matching the first user identification data has not disappeared from the environmental image, the method proceeds to step S217: determining whether the facial image matching the user identification data is the facial image having the largest area.

If the facial image matching the user identification data is determined to be the facial image having the largest area, the method proceeds to step S212: maintaining the corresponding user account to be logged in. If the facial image matching the user identification data is determined not to be the facial image having the largest area, the method returns to step S208: recognizing only the facial image having the largest area.

Therefore, multiple user operations are intuitively supported by the voice control method through the above process, such that the misuse of personal accounts by others resulting in the leakage of personal information can be avoided, and further preventing the loss of personal rights or money.

Advantageous Effects of Embodiments

One of the advantages of the present disclosure is that the voice control device provided by the present disclosure can automatically log in to the user account by using face detection and identification through the technical features of the "image capture module" and the "management module". During the successful detection of the face, the user can issue a voice command without any wake-up words, thus omitting the need to repeat the wake-up words or eliminating concerns about exceeding the time limit. Multiple user operations are also intuitively supported, such that the misuse of personal accounts by others resulting in the leakage of personal information can be avoided, and further preventing the loss of personal rights or money.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A voice control device, comprising:
   a user database configured to store first user identification data of a first user account;
   an image capture module configured to capture an environmental image;
   a voice command module configured to be enabled to receive a voice command to control the voice control device; and
   a management module configured to detect whether the environmental image has at least one facial image, and detect whether the facial image matches with the first user identification data, and wherein when the facial image matches with the first user identification data, the management module logs in the first user account and enables the voice command module,
   wherein the image capture module includes a first camera and a second camera disposed at two sides of the voice control device, the first camera and the second camera capture, respectively through a first image capturing range and a second image capturing range, a plurality of environmental images including a first environment image and a second environment image under the same image-capturing condition;
   wherein the management module is configured to detect whether the plurality of environmental images have at least one facial image;
   wherein in response to a plurality of facial images being recognized from the plurality of environmental images, the management module obtains one of the plurality of facial images with the largest area according to areas of the plurality of facial images recognized from the environment images, and identifies whether the facial image having the largest image area matches with the first user identification data.

2. The voice control device of claim 1, further including a prompting module, configured to provide a first prompting operation to prompt a current status of the first user account, wherein the first prompting operation includes sounds, images, or indicator lights.

3. The voice control device of claim 1, wherein the voice command module includes an audio receiving device for receiving the voice command.

4. The voice control device of claim 1, wherein the first user identification data includes one or more facial images of a user and specific features of the user.

5. The voice control device of claim 1, wherein the user database further stores a first user configuration associated with the first user account, and when the management module logs in to the first user account, the first user configuration is accessed correspondingly.

6. The voice control device of claim 5, wherein the first user configuration includes media playlists, device settings, or personal information.

7. The voice control device of claim 1, wherein when the management module recognizes that the facial image matching the first user identification data has disappeared, logs out the first user account and disables the voice command module.

8. The voice control device of claim 1, wherein the image capturing module includes a plurality of cameras for obtaining the plurality of environmental images.

9. The voice control device of claim 1, wherein when the voice control device logs in the first user account, if the facial image having the largest image area does not match with the first user identification data, the management module logs out the first user account and disables the voice command module.

10. The voice control device of claim 1, wherein the user database stores second user identification data of a second user account, and when the voice control device logs into the first user account, if the facial image having the largest image area matches with the second user identification data, the management module logs out the first user account and logs in the second user account.

11. The voice control device of claim 1, further including a communication module for connecting to the user database via a network.

12. The voice control device of claim 1, further including a processor, a power supply device, a storage device or a display module, and combinations thereof.

13. A voice control method, applied to a voice control device, the voice method includes:
   configuring a user database to store first user identification data of a first user account;
   capturing at least one environmental image;
   detecting whether the environmental image has at least one facial image, and detecting whether the facial image matches with the first user identification data, and when the facial image matches with the first user identification data, logging in the first user account and enabling the voice command module; and
   enabling the voice control device to receive a voice command when the first user account is logged in,
   wherein the image capture module includes a first camera and a second camera disposed at two sides of the voice control device, and the voice control method further includes:
   configuring the first camera and the second camera to capture, respectively through a first image capturing range and a second image capturing range, a plurality of environmental images including a first environment image and a second environment image under the same image-capturing condition;

configuring the management module to detect whether the plurality of environmental images have at least one facial image;

in response to a plurality of facial images being recognized from the plurality of environmental images, configuring the management module to obtain one of the plurality of facial images with the largest area according to areas of the plurality of facial images recognized from the environment images, and identifying whether the facial image having the largest image area matches with the first user identification data.

14. The voice control method of claim 13, further including activating a first prompting operation of the voice control device to prompt a current status.

15. The voice control method of claim 13, further including: when the facial image that matches with the first user identification data has disappeared from the environmental image, configuring the voice control device to log out the first user account and disable a voice command function.

16. The voice control method of claim 13, further including configuring the user database to store second user identification data of a second user account, wherein when the first user account is logged in, if the management module recognizes that another facial image is larger than the facial image and matches with the second user identification data, the second user account is logged in.

17. The voice control method according to claim 13, further including:
configuring the user database to store a first user configuration associated with the first user account; and
accessing, when the management module logs in to the first user account, the first user configuration correspondingly.

18. The voice control method according to claim 13, further including: only identifying, when the plurality of the facial images are recognized from the environmental image, whether the facial image having the largest image area matches with the first user identification data.

19. The voice control method according to claim 13, further including: obtaining the first user identification data of the first user account from the user database through a network.

* * * * *